Patented July 22, 1924.

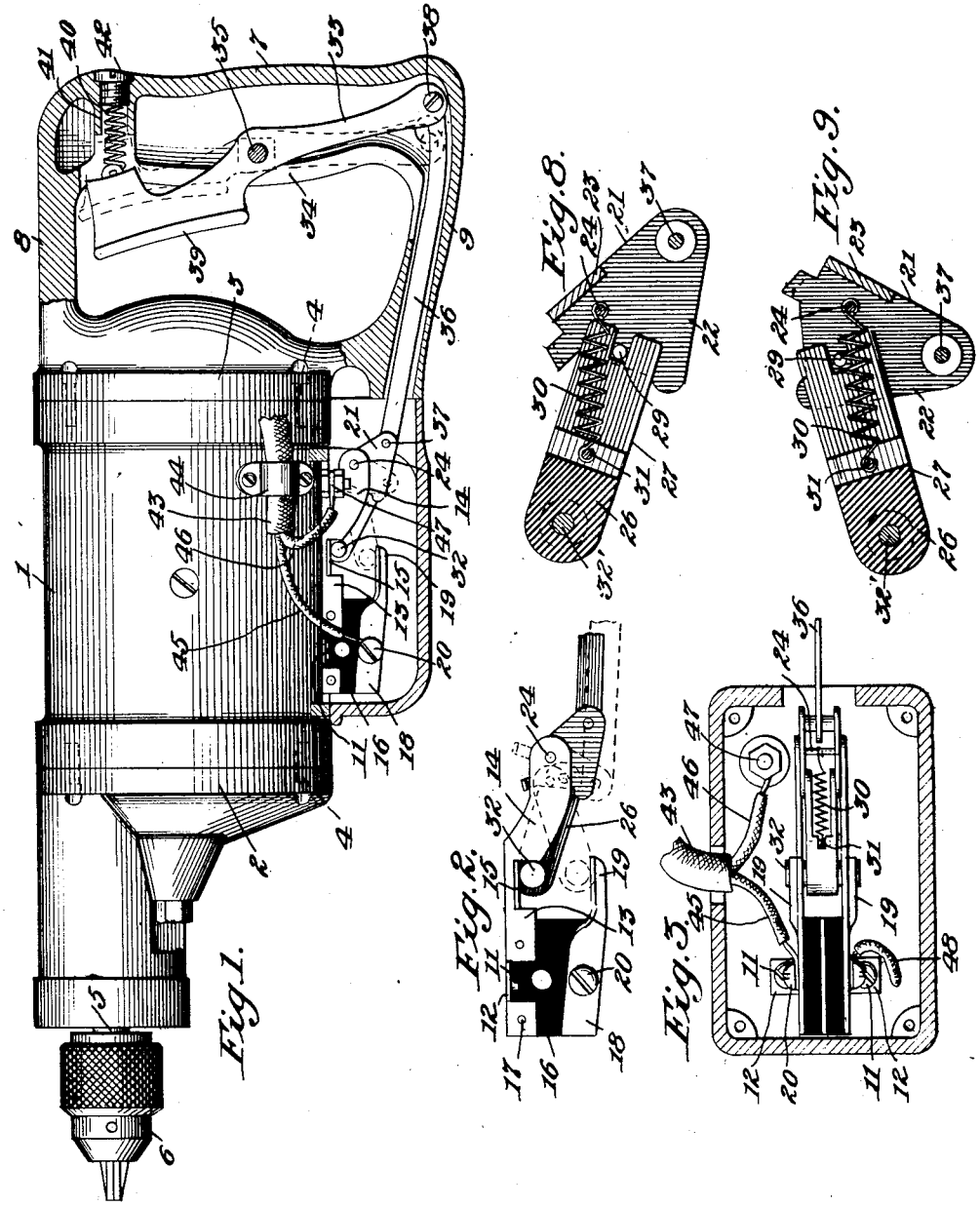

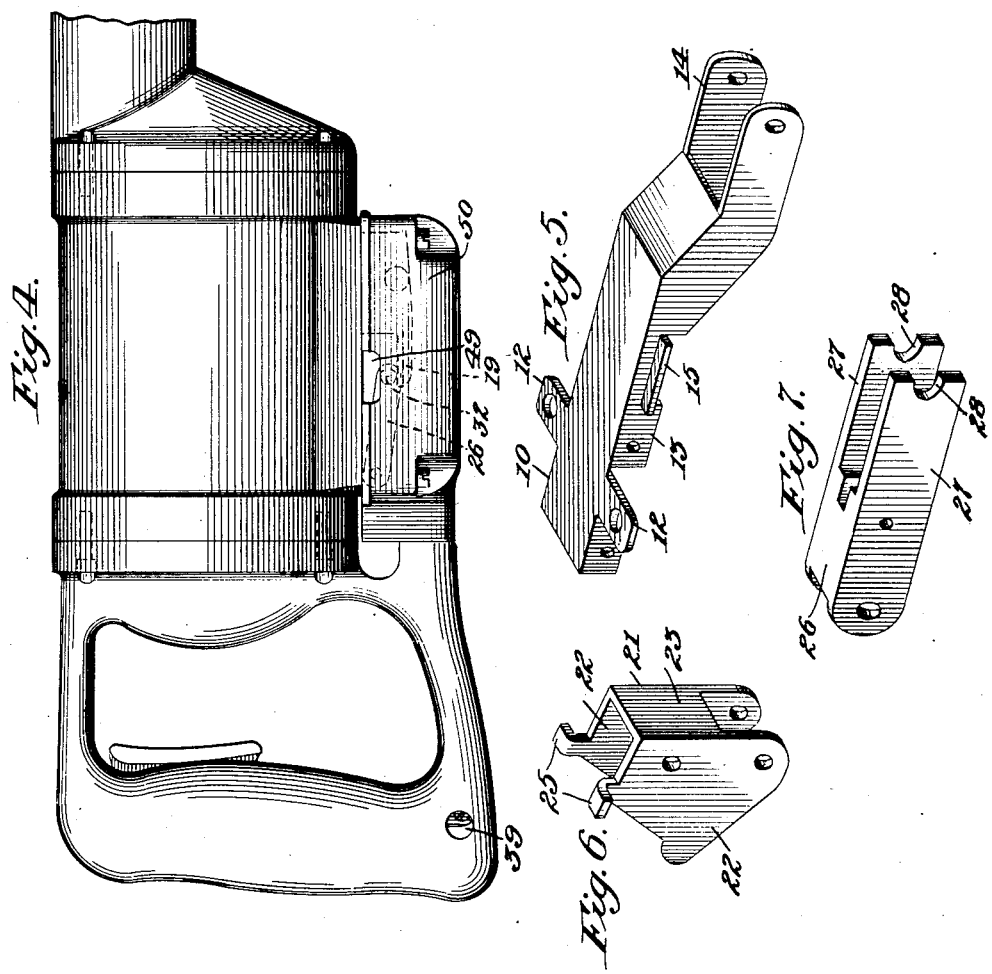

1,502,169

UNITED STATES PATENT OFFICE.

CHARLES B. BENNETT, OF LOUISVILLE, KENTUCKY, ASSIGNOR TO JAMES CLARK, JR. ELECTRIC COMPANY, OF LOUISVILLE, KENTUCKY, A CORPORATION OF KENTUCKY.

ELECTRIC TOOL.

Application filed November 5, 1921. Serial No. 513,037.

*To all whom it may concern:*

Be it known that I, CHARLES B. BENNETT, residing at Louisville, in the county of Jefferson and State of Kentucky, have invented new and useful Improvements in Electric Tools, of which the following is a specification.

This invention relates to portable electric tools of the self-contained type which includes electric motors, and an object of the invention is to provide such a tool with an improved handle shaped and arranged to facilitate the manipulation of the tool. The handle is of the type used on hand-saws, and is mounted on a removable head of the motor casing, whereby the handle is removed with the removable head whenever access is to be had to the motor.

A further object of the invention is to provide for conveniently actuating the electric switch for starting and stopping the operation of the motor, and also to enable the actuation of the switch by the operator's hand which holds or grasps the handle. I mount the switch and all electrical connections on the motor casing, while the switch actuating mechanism is mounted on the handle, provision being made for convenient disconnection of the actuating mechanism from the switch in order that the removal of the handle may not disturb the switch nor any of the electrical connections.

When the tool is not in operation, the switch is of course open and may be conveniently closed for starting the motor merely by pressing upon the actuating lever mounted upon the handle. On releasing the lever, which is spring pressed, the switch will be snapped into its open position so as to stop the motor. Provision is also made whereby the switch may be maintained closed without requiring the operator to hold the actuating lever in its retracted position.

With these and other objects in view, the present invention consists in the combination and arrangement of parts as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

In the drawings:

Figure 1 is a side elevation of an electric tool embodying the features of the present invention, the handle and the switch casing being in section to expose the electric switch and the actuating mechanism therefor.

Figure 2 is a side elevation, on an enlarged scale, of the switch removed from the motor casing.

Figure 3 is a bottom plan view of the switch with the casing in section.

Figure 4 is a side elevation looking at the opposite side of the tool from that shown in Figure 1.

Figure 5 is an enlarged detailed perspective view of one of the switch elements.

Figure 6 is a detailed perspective view of the bell crank link or member of the toggle portion of the switch.

Figure 7 is a detailed perspective view of the spring actuated link or member of the toggle.

Figure 8 is a detailed fragmentary view illustrating the positions of the toggle members in the open condition of the switch.

Figure 9 is a similar view showing the positions of the toggle members in the closed condition of the switch.

In the accompanying drawings there has been shown an electric tool in the form of a drill, the details of which form no part of the present invention. The electric motor of the tool, not shown, is contained within a motor casing 1 of any desired form but preferably in the form of an open ended cylinder provided with a front removable head 2 and a rear removable head 3, each of said heads being detachably held in place by suitable screw threaded fastenings indicated in dotted lines at 4. A suitable tool spindle 5 projects longitudinally at the front of the casing and is equipped with a suitable chuck 6 to which any appropriate form of drill or tool may be fitted in the usual manner. By reason of the fact that the heads 2 and 3 may be removed, access may be conveniently had to the motor housed within the casing 1.

In carrying out one of the features of the present invention, a handle is provided upon the rear removable head 3, this handle preferably being of the type commonly employed upon hand-saws and includes a grip or cross-bar 7 connected at its top and bottom with the removable head 3 by means of the connecting elements 8 and 9. While not necessary, I prefer to form the head 3 and the parts of the handle as an integral casting. With a handle of the form shown in the drawings, very convenient manipulation of the tool may be had, as the entire tool may be held in one hand and pressure applied directly to the rear end of the tool in the most effective and satisfactory manner.

While any desired form of electric switch may be employed for starting and stopping the motor, a satisfactory switch construction has been shown in the drawings. This switch mechanism includes a base member 10 fitted flat against the bottom of the motor casing and secured thereto by suitable fastenings 11 extending through perforated ears 12 projecting laterally from said base member. Extending along each edge of the base member is a depending flange 13 which extends beyond the rear of the member and is deflected downwardly to form an arm 14. The two arms 14 constitute a fork or yoke at the rear end of the base member 10. Each of the flanges 13 is provided with an outwardly directed shoulder 15 formed by bending outwardly a portion of the flange. A block of insulating material 16 is disposed between the flanges 13 and secured thereto by suitable fastenings 17 extending through the flanges 13 and the block 16. A contact member 18 is suitably secured to each side of the block 16 and has a finger portion 19 projecting rearwardly at the rear end of the block. A suitable binding post 20 is provided for each of the contacts.

Electric connection is established between the two finger-portions 19 of the two contact members 18 by a snap device in the form of a toggle including a bell crank member 21 made up of a pair of duplicate segmental plates 22 connected at their rear edges by a cross-bar or plate 23. This bell crank member is received between the arms of the fork or yoke 14 to which it is pivoted as at 24 in Figures 1 and 2. Suitable stop projections 25 arise from the top edges of the plates 22 and overhang the top of the yoke arms 14 so as to contact therewith and limit the pivotal movement of the bell crank member in one direction. In front of the bell crank member is a link 26 made of insulating material and slotted or bifurcated longitudinally to form yoke or fork arms 27 which are received between the side members 22 of the bell crank. Each of the fork arms 27 is provided with a notch or seat 28 receiving a pin or projection 29 extending inwardly from the adjacent side wall 22 of the bell crank lever. A helical spring 30 is disposed in the slot or bifurcation of the link 27 and has one end connected to a pin 31 extending through the bifurcated portion of the link, the other end of the spring being connected to the pivot pin 24. Normally the position of the toggle is shown in full lines in Figures 1 and 2, the insulating link 26 being provided at its front free end and at opposite sides with contact elements 32, in the form of rollers connected by a pin or axle 32', which rollers lie normally against the adjacent parts 15. By swinging the bell crank 21 forwardly, the pins 29 thereof will lift the rear end of the toggle link 26 against the tension of the spring 30, the parts 32 bearing upon the parts 15 as a fulcrum until the spring 30 is moved across the center, whereupon the pins 29 will become the pivotal support for the rear end of the toggle link 26 and the latter will be snapped downwardly to the position shown in dotted lines in Figures 1 and 2, with its members 32 in engagement with the contact fingers 19, thereby establishing an electric connection between said finger-portions 19, permitting current to flow from one of the elements 18 to the other element 18 through the conducting rollers 32 and their connecting pin or axle 32'. This is the closed position of the switch which starts the electric motor and maintains it in operation.

The means for manually actuating the snap switch includes a lever 33 mounted within the hollow handle 7 and inserted therein through a slot 34 in the inner face of the handle. This lever is fulcrumed intermediate of its ends as at 35 and has its lower end connected to the lower end of the bell crank 21 by means of a connecting rod 36 pivoted as at 37 to the bell crank and connected to the lower end of the lever 33 by means of the removable pivot pin 38. The connection 38 is preferably a screw threaded pin capable of being removed, for convenience in connecting and disconnecting the link or rod 36 to the lever 33. Access to the removable fastening 38 is obtained through an opening 34 in the handle. The upper end of the lever 33 normally lies in front of the handle and is laterally enlarged to form a finger piece or grip 39. A compression spring 40 is fitted within a seat 41 in the handle 7 and bears against the rear side of the lever 33 adjacent the upper end of the finger piece portion thereof so as to normally and yieldably maintain the lever in the position shown in Figure 1 with the switch in its open position. The seat 41 is open at its rear end and is provided with a closure 42 in the form of a screw plug whereby the spring may be conveniently fitted in place and removed.

The tool is provided with a cable 43 of suitable length and provided at its free end with a plug or suitable connector. This cable is secured to the motor casing by a suitable clamp or bracket 44. One of the conductors 45 leads from the cable to one of the binding posts 20 while the other conductor 46 leads to a binding post 47 provided upon the bottom of the casing and connected inside of the casing to the motor in any well known or approved manner. A conductor 48 leads from the other binding post 20 upwardly through the bottom of the casing and to the motor in any approved manner.

With the parts in positions shown by full lines in Figure 1 of the drawings, it will be understood that the switch is open. To start the motor, the operator takes the handle 7 in one hand and presses against the finger piece 39 of the switch actuating lever 33, whereby the lower end of the lever will be moved forwardly to the dotted position carrying with it the link or connecting rod 36 which will turn or rock the bell crank 21 to the dotted position which, as hereinbefore described, will result in the breaking of the toggle, formed by the bell crank 21 and the link 26, whereby the latter will be snapped down into engagement with the contacts 19, thus closing the switch and starting the motor. So long as the pressure of the hand remains upon the lever 33, the switch will be maintained closed and the motor continued in operation. Upon relieving pressure from the finger piece 39 of the lever 33, the spring 40 will return the lever 33 to its normal position, whereby the link or connecting rod 36 will be pulled back to its normal position, the toggle will be broken downwardly and the link 26 will be snapped upwardly into its normal full line position, whereby the switch will be open and the motor will be stopped.

The switch may be maintained closed and the motor in operation by thrusting a pin or other device into the opening 34 in the handle 7 and in rear of the lever 33 so as to maintain the same in its dotted position. The same result may be accomplished, reference being had to Figure 4 of the drawing, by thrusting a pin or the like into an opening 49 in the casing 50 which incloses the switch, said pin overlying the free end portion of the link 26 and holding it down in engagement with the contacts 19.

Whenever it is desired to remove the handle or to have access to the motor, the pivotal connection 38 is removed through the opening 34 in the handle, and the fastenings 4 are removed from the head 3, whereupon the latter, the handle and the mechanism contained therein, with the exception of the link or rod 36, may be withdrawn from the casing and the switch without in any manner disturbing the latter or any of the electrical connections.

By mounting the switch on the casing 1 in front of and also independent of the handle 7, the several parts of the tool may be assembled, and prior to fitting the handle in place, the motor and switch may be tested, and the commutator and brush mechanism adjusted, through the open rear end of the casing 1, during the testing of the tool

What I claim is:

1. An electric tool comprising a motor casing, a tool spindle projecting at one end of the casing, a removable handle for the casing, an electric switch for starting and stopping the motor and mounted upon the motor casing, and located in front of the handle, and a hand-operated switch-actuating means carried by the removable handle and detachably associated with the switch.

2. An electric tool comprising a motor casing, a tool spindle projecting at one end of the casing, a removable handle for the opposite end of the casing, a switch for starting and stopping the motor and carried by the casing and in front of the handle, a hand-operated lever fulcrumed upon the handle, and a detachable operating connection between the lever and the switch.

3. An electric tool comprising a motor casing, a tool spindle projecting at one end of the casing, a removable head for the opposite end of the casing, a handle carried by the removable head and provided with a longitudinal slot, a switch for starting and stopping the motor and mounted upon the motor casing, a hand operated lever fulcrumed within the slot portion of the handle, a connecting member between the lever and the switch, and a detachable pivotal connection between the connecting member and the lever.

4. An electric tool comprising a motor casing, a tool spindle projecting at one end of the casing, a removable head for the opposite end of the casing, a switch for starting and stopping the motor and mounted on the casing and located in front of the handle, a handle of the hand-saw type carried by the removable head, a lever fulcrumed upon the handle and having a finger portion lying between the handle and the removable head, and a detachable connection between the lever and the switch.

5. An electric tool comprising a motor casing, a tool spindle projecting at one end of the casing, a removable head for the opposite end of the casing, a handle of the hand-saw type carried by the removable head, the grip portion of the handle being hollow and provided with a longitudinal slot in its front face, a switch for starting and stopping the motor and mounted on the casing and located in front of the handle, a lever fulcrumed within the handle and having a finger portion extending outwardly through the slot in the handle, a spring to yieldably maintain the finger portion of the lever in its forward position, and a link detachably connecting the other end of the lever with the switch.

6. An electric tool comprising a motor casing, a tool spindle projecting at one end of the casing, a handle at the opposite end of the casing, a switch for starting and stopping the motor and mounted on the casing, and hand-operated means for actuating the switch and including a lever having a portion fulcrumed within the handle, said handle having an opening adjacent the lever for the reception of a pin or plug to hold the lever in the closed condition of the switch.

7. An electric tool comprising a motor casing, a tool spindle projecting at one end of the casing, a removable head for the opposite end of the casing, a handle of the hand-saw type carried by the head, the grip portion of the handle being hollow and provided with a longitudinal slot in its front side, a switch for starting and stopping the motor and carried by the motor casing, means for manually operating the switch including a lever fulcrumed intermediate of its ends within the hollow portion of the handle and provided with the finger portion lying between the handle and the removable head, a spring for yieldably maintaining the finger portion of the lever at its forward limit, a link extending through a bore in the handle and having one end pivotally connected to a movable part of the switch, and a screw threaded pivot pin detachably connecting the link to the lever, the handle being provided with an opening to give access to the removable pivot connection.

8. An electric tool comprising a motor casing, a tool spindle, a handle on the casing, a switch for starting and stopping the motor and mounted on the casing, a hand operated means for actuating the switch and including a lever having a portion fulcrumed within the handle, and said handle having an opening adjacent the lever for the reception of a pin or plug to hold the lever in the closed condition of the switch.

9. A tool comprising a motor casing, a tool spindle projecting at one end of the casing, a removable handle for the casing, a switch for starting and stopping the motor and mounted upon the motor casing and in front of the handle, and a hand-operated switch-actuating means carried by the removable handle and detachably associated with the switch.

10. A tool comprising a motor casing, a tool spindle projecting at one end of the casing, a removable handle for the opposite end of the casing, a switch for starting and stopping the motor and carried by the casing and in front of the handle, a hand-operated lever fulcrumed upon the handle, and a detachable operating connection between the lever and the switch.

CHARLES B. BENNETT.